US009940562B2

(12) United States Patent
Kasai (10) Patent No.: US 9,940,562 B2
(45) Date of Patent: Apr. 10, 2018

(54) CONTROL METHOD OF A PRINTER, AND PRINTER

(71) Applicant: Seiko Epson Corporation, Tokyo (JP)

(72) Inventor: Yuichiro Kasai, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/347,246

(22) Filed: Nov. 9, 2016

(65) Prior Publication Data

US 2017/0132502 A1  May 11, 2017

(30) Foreign Application Priority Data

Nov. 9, 2015 (JP) ................................. 2015-219213

(51) Int. Cl.
*G06K 15/00* (2006.01)
*G05B 19/048* (2006.01)

(52) U.S. Cl.
CPC ......... *G06K 15/404* (2013.01); *G05B 19/048* (2013.01); *G06K 15/406* (2013.01); *G06K 15/4085* (2013.01); *G05B 2219/37355* (2013.01)

(58) Field of Classification Search
CPC ............ G05B 19/048; G06K 15/4085; G06K 15/406; G06K 15/404
USPC ....................................................... 358/1.14
See application file for complete search history.

(56) References Cited

U.S. PATENT DOCUMENTS

| 5,594,653 | A | 1/1997 | Akiyama et al. |
| 6,198,985 | B1 * | 3/2001 | Miyasaka ............... G06F 3/121 358/1.15 |
| 6,205,363 | B1 | 3/2001 | Miyasaka et al. |
| 6,208,906 | B1 | 3/2001 | Miyasaka et al. |
| 6,360,135 | B1 | 3/2002 | Miyasaka et al. |
| 6,362,896 | B1 | 3/2002 | Miyasaka et al. |
| 6,434,445 | B2 | 8/2002 | Miyasaka et al. |
| 6,453,208 | B2 | 9/2002 | Miyasaka et al. |
| 6,697,678 | B2 | 2/2004 | Miyasaka et al. |
| 6,975,423 | B2 | 12/2005 | Koakutsu et al. |
| 2011/0109941 | A1 * | 5/2011 | Kasai ....................... B41J 29/38 358/1.16 |

(Continued)

FOREIGN PATENT DOCUMENTS

| JP | 2002-067455 A | 3/2002 |
| JP | 2002-178617 A | 6/2002 |
| JP | 2002-178671 A | 6/2002 |

(Continued)

*Primary Examiner* — Neil R McLean
(74) *Attorney, Agent, or Firm* — Nutter McClennen & Fish LLP; John J. Penny, Jr.

(57) ABSTRACT

A printer control method prevents the user from repeatedly executing an error recovery operation when a cutter error occurs. The printer 2 has a cutter 22 that moves a movable knife 32 between a home position HP and cutting position CP and cuts recording paper 6 at the cutting position CP. When a cutter error in which the movable knife 32 does not return from the home position HP is detected (step ST5), the host device 3 reports a cutter error (step ST6). When the printer 2 executes a cutter error recovery operation (step ST9) and again detects a cutter error (step ST5), it detects a non-recoverable error as being unable to recover from the cutter error (step ST10), and reports the non-recoverable error (step ST11).

12 Claims, 4 Drawing Sheets

(56) References Cited

U.S. PATENT DOCUMENTS

2011/0170134 A1* 7/2011 Murashima ......... G06F 11/0733
358/1.15

FOREIGN PATENT DOCUMENTS

| JP | 2002-326412 A | 11/2002 |
|---|---|---|
| JP | 2013-071227 A | 4/2013 |

* cited by examiner

CONTROL METHOD OF A PRINTER, AND PRINTER

This application claims priority under 35 U.S.C. § 119 to Japanese Patent Application No. 2015-219213 filed on Nov. 9, 2015, the entire disclosure of which is expressly incorporated by reference herein.

BACKGROUND

1. Technical Field

The present invention relates to a control method of a printer having a cutter, and to a printer.

2. Related Art

Some printers that print on continuous recording paper such as receipt paper and label paper also have a cutter for cutting the recording paper. Such printers convey the recording paper through a conveyance path passing the printing position of the printhead and the cutting position of the cutter, print on the recording paper at the printing position, and cut the printed portion of the recording paper at the cutting position. The cutter moves the cutter blade between the cutting position and home position, and moves the cutter blade to the cutting position to cut the recording paper. The cutting position is the cutting position on the paper conveyance path, and the home position is a position removed from the paper conveyance path.

When there is a foreign object at the cutting position or the recording paper jams (a paper jam occurs), the foreign object or the jammed paper may interfere with the action of the cutter blade and prevent the cutter blade from returning to the home position. When this happens, the printer reports a cutter error and prompts the user to remove the foreign object or recording paper. The user then removes the foreign object or recording paper. The printer described in JP-A-2002-178617 reports the cutter error to the user.

When the cutter blade bites into the foreign object or jammed recording paper such that the cutter blade cannot return to the home position, recovery from the cutter error is difficult until the user removes the foreign object or jammed recording paper. However, the user may repeatedly attempt the error recovery operation for recovering from the cutter error without first removing the foreign object or jammed recording paper.

SUMMARY

An objective of the invention is to provide a control method of a printer and a printer that can suppress attempts by the user to repeatedly execute the error recovery operation to recover from a cutter error.

One aspect of the invention is a control method of a printer capable of communicating with an external device, configured to have a controller, a cutter configured to move a cutter knife and cut recording paper between a home position and a cutting position, using the controller, including: reporting a cutter error when the moved cutter knife does not return to the home position; executing an error recovery operation to attempt to move the cutter knife to the home position based on an error recovery command corresponding to the cutter error; and detecting a non-recoverable error, if the cutter error is detected again even though the error recovery operation was executed, and reporting the non-recoverable error.

If a cutter error is again detected even though the error recovery operation for recovering from a cutter error executed, this configuration reports the cutter error as a non-recoverable error. The user repeatedly executing the error recovery operation can therefore be suppressed.

In another aspect of the invention, the error recovery command is based on detecting a power turning on, an error recovery command from the external device, or a cover closing.

The error recovery operation may be an operation that attempts to return the cutter knife to the home position. More specifically, if recording paper or a foreign object interferes with the cutter knife and prevents the cutter knife from returning to the home position, this configuration can cause the printer to execute the error recovery operation to move the cutter knife to the home position after the recording paper or foreign object is removed and the power turning on, an error recovery command, or the cover closing is detected. As a result, the cutter error can be resolved.

The control method of a printer according to another aspect of the invention includes not executing the error recovery operation when a non-recoverable error occurs even if the error recovery command is detected.

When the user repeatedly sends an error recovery command from the external device without first removing the recording paper or foreign object, this configuration prevents the error recovery operation from executing repeatedly.

Note that because the power is turned on (turns on after the obstacle is removed) or the cover closes (the cover closes after the obstacle is removed) when the user has removed the recording paper or foreign object, recovery from the cutter error should be possible and the error recovery operation can be executed when one of these actions is detected after the obstacle is removed.

Further preferably, the control method of a printer according to another aspect of the invention also includes: counting how many times the error recovery operation was performed if the cutter error is again detected after the error recovery operation is executed; and reporting the non-recoverable error if this error recovery operation count reaches a previously set number.

This aspect of the invention allows the user to try the error recovery operation a specific number of times, and suppresses further executing the error recovery operation.

Further preferably, the control method changing from a print mode in which data can be received from the external device and printed to an off-line mode in which receiving data from the external device stops if the cutter error or non-recoverable error is detected; and while in the off-line mode, continuing to receive a real-time command from the external device, and reporting the cutter error or non-recoverable error to the external device based on the real-time command.

This configuration enables an external device to detect that an error has occurred on the printer even when the printer is in the off-line mode.

The control method of a printer according to another aspect of the invention preferably also includes: determining if the cutter knife is at the home position if print data containing a cut command is received from the external device after the non-recoverable error is detected; and if the cutter knife is determined to be at the home position, printing the print data on the recording paper, ignoring the cut command, and not executing the cutting operation with the cutter knife.

This configuration enables continuing printing print data without cutting the paper when a non-recoverable error has occurred in the cutter.

Another aspect of the invention is a printer including: a memory configured to store a firmware; a controller configured to execute the firmware in the memory; a communicator configured to communicate with an external device; a cutter knife; a moving mechanism configured to move the cutter knife between a home position and a cutting position to cut recording paper; a cutter error detector configured to detect the cutter knife moved by the moving mechanism not returning to the home position as a cutter error; the controller configured to execute an error recovery operation of operating the moving mechanism and attempting to move the cutter knife to the home position based on an error recovery command responding to the cutter error; a non-recoverable error detector configured to detect again detecting a cutter error even though the error recovery operation executed as a non-recoverable error; and a reporter configured to report the cutter error when the cutter error occurs, and report the non-recoverable error when the non-recoverable error occurs.

If a cutter error is again detected even though the error recovery operation for recovering from a cutter error executed, non-recoverable errors can still be detected and reported. The user repeatedly executing the error recovery operation can therefore be suppressed.

Preferably, a printer according to another aspect of the invention also has: at least one of a power detector, a command detector, and a cover detector; and the controller handles at least one of the power detector detecting the power turned on, the command detector detecting the error recovery command from the external device, and the cover detector detecting a cover closed, as an error recovery command detection and executes the error recovery operation.

When interference between the recording paper or a foreign object and the cutter knife prevents the cutter knife from returning to the home position, this configuration causes the printer to execute the error recovery operation to move the cutter knife to the home position after the recording paper or foreign object is removed and the power turning on, an error recovery command, or the cover closing is detected. As a result, the cutter error can be resolved.

In another aspect of the invention, when the non-recoverable error detector detects the non-recoverable error, the controller does not execute the error recovery operation even if the command detector detects at least the error recovery command.

When the user repeatedly asserts an error recovery command without first removing the recording paper or foreign object, this configuration prevents the error recovery operation from executing repeatedly.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printer according to the invention is described below with reference to the accompanying figures.

General Configuration of a Printing System

Figure 1A:
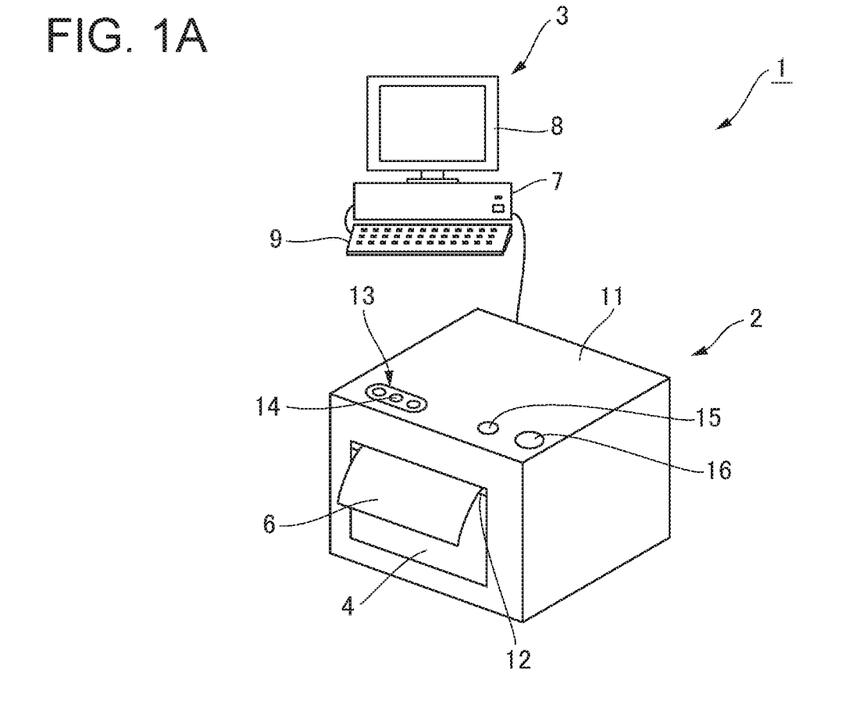
FIG. 1A illustrates a printing system having a printer according to a preferred embodiment of the invention.
Figure 1B:
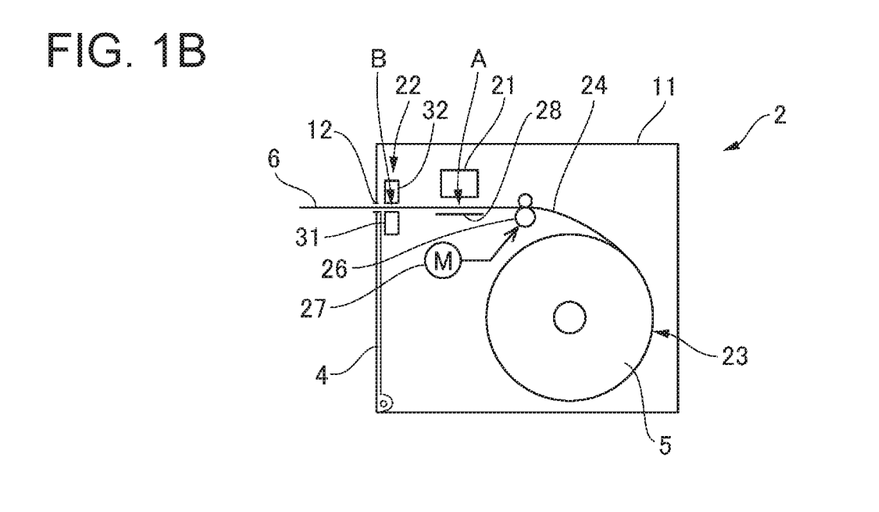
FIG. 1B illustrates the internal configuration of a printer according to a preferred embodiment of the invention.
Figure 2A:
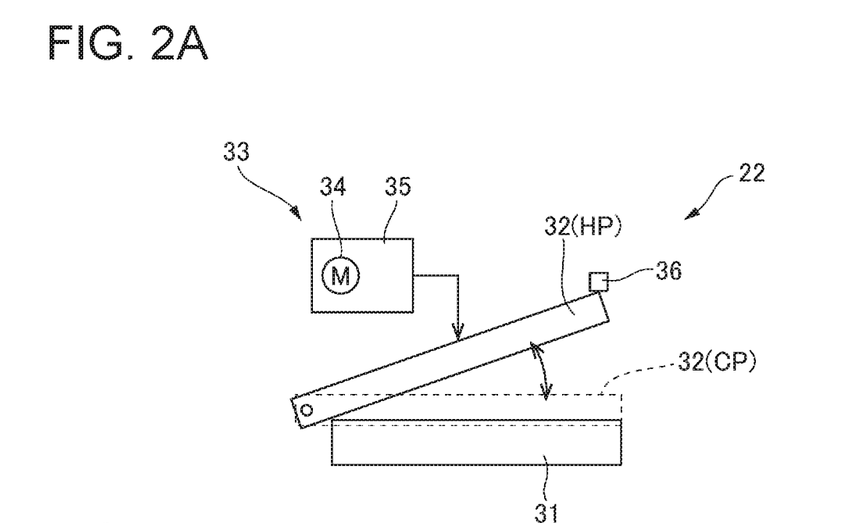
FIG. 2A illustrates a cutter according to an embodiment of the invention.
Figure 2B:
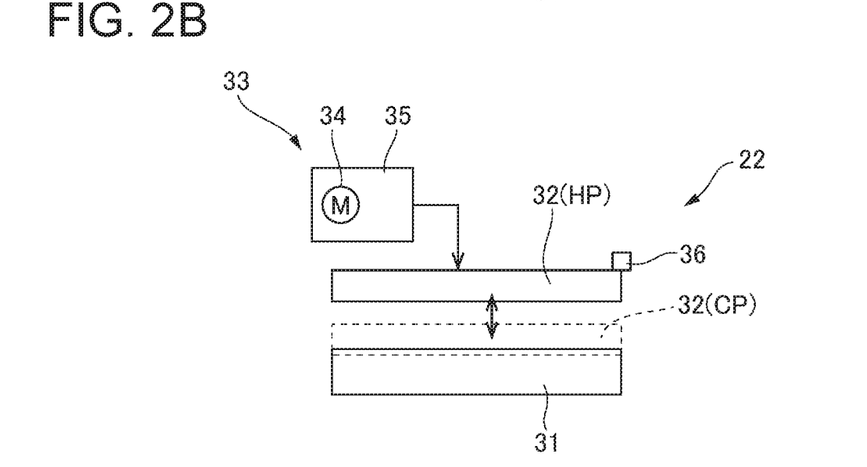
FIG. 2B shows another example of a cutter according to the invention.

FIG. 1A illustrates a printing system including a printer, and FIG. 1B illustrates the internal configuration of a printer according to an embodiment of the invention. FIG. 2A and FIG. 2B describe examples of cutters that may be used in the printer shown in FIG. 1A and FIG. 1B.

As shown in FIG. 1A, a printing system 1 according to the invention includes a printer 2 and a host device 3 (external device) that is communicatively connected to the communication unit 41 (communicator) of the printer 2. The printer 2 in this example is a roll paper printer that prints to continuous recording paper 6 delivered from a paper roll 5.

The host device 3 includes a computer 7, a display 8 connected to the computer 7, and an input device 9 such as a keyboard connected to the computer 7.

As shown in FIG. 1A, the printer 2 has a generally box-shaped printer case 11. A paper exit 12 for discharging the recording paper 6 is disposed in the top front part of the printer case 11. A cover 4 that is opened and closed when installing the recording paper 6 is also provided at the front of the printing system 1. The paper exit 12 extends along the width of the printer 2. A display unit 13 (display) is disposed on top of the printer case 11. The display unit 13 includes an LED 14. Beside the display unit 13 are an error cancellation button 15 and a power button 16.

As shown in FIG. 1B, the printer 2 has a printhead 21 and a cutter 22 inside the printer case 11. The cutter 22 is an automatic cutter, and is disposed near the paper exit 12. The printhead 21 is located behind (upstream of) the cutter 22. Also disposed inside the printer case 11 are a roll paper compartment 23, and a conveyance path 24 going from the roll paper compartment 23 to the paper exit 12 and passing the printing position A of the printhead 21 and the cutting position B of the cutter 22. The continuous recording paper 6 delivered from the paper roll 5 loaded in the roll paper compartment 23 is conveyed through the conveyance path 24.

Also inside the printer case 11 of the printer 2 is a conveyance mechanism 25 for conveying the recording paper 6 through the conveyance path 24. The conveyance mechanism 25 includes a conveyance roller 26 and a conveyance motor 27 that drives the conveyance roller 26.

The printing position A of the printhead 21 is defined by the platen 28 opposite the printhead 21. Note that if the printhead 21 is a thermal head, the printing position A of the printhead 21 is defined by a platen roller that also functions as a conveyance roller.

The cutter 22 includes a fixed knife 31 on one side (the bottom side in this example) of the conveyance path 24, a movable knife 32 (cutter blade) that moves to and away from the fixed knife 31, and a moving mechanism 33 that moves the movable knife 32 (see FIG. 2A and FIG. 2B). The cutting position B of the cutter 22 is defined by the fixed knife 31. The moving mechanism 33 moves the movable knife 32 between the cutting position CP and the home position HP. The cutting position CP is the position where the movable knife 32 slides across the fixed knife 31 at the cutting position B and cuts the recording paper 6 being conveyed through the conveyance path 24. The home position HP is the position to which the movable knife 32 retracts from the cutting position CP (cutting position B) and does not interfere with the recording paper 6 conveyed through the conveyance path 24.

When the communication unit 41 receives print data from the host device 3, the controller 40 drives the printhead 21 to print on the recording paper 6 passing the printing position A. The controller 40 also drives the conveyance motor 27 and the recording paper 6 is conveyed through the conveyance path 24 while being printed. If a cut command for cutting the recording paper 6 is contained in the print data, the controller 40 also drives the cutter 22 based on the cut command to cut the printed portion of the recording paper 6 at the cutting position B.

As shown in FIG. 2A, the cutter 22 of the printer 2 in this example is a scissor cutter in which the movable knife 32 pivots relative to the fixed knife 31. With this type of cutter 22, the moving mechanism 33 includes a cutter motor 34 as the drive source, and a motion conversion mechanism 35 that converts the rotary drive power of the cutter motor 34 to the reciprocating motion of the movable knife 32. The movable knife 32 moves between the home position HP where the cutting edge is at an angle to the cutting edge of the fixed knife 31, and the cutting position CP where the cutting edge of the movable knife 32 and the cutting edge of the fixed knife 31 are parallel and overlap. The cutter 22 also has a cutter sensor 36 that detects the movable knife 32 at the home position HP.

As shown in FIG. 2B, a guillotine cutter in which the movable knife 32 moves linearly to and away from the fixed knife 31 may also be used as the cutter 22 of the printer 2. With this type of cutter 22, the moving mechanism 33 includes a cutter motor 34 as the drive source, and a motion conversion mechanism 35 that converts the rotary drive power of the cutter motor 34 to the reciprocating linear motion of the movable knife 32. The movable knife 32 moves between the home position HP where the cutting edge is separated from the cutting edge of the fixed knife 31, and the cutting position CP where the cutting edge of the movable knife 32 and the cutting edge of the fixed knife 31 overlap. The cutter 22 also has a cutter sensor 36 that detects the movable knife 32 at the home position HP.

A switch that directly detects positioning of the movable knife 32 to the home position HP may be used as the cutter sensor 36. A device that detects the position of the movable knife 32 based on the rotational angle position of a gear in the motion conversion mechanism 35, for example, may also be used as the cutter sensor 36.

Control System of the Printer

Figure 3:
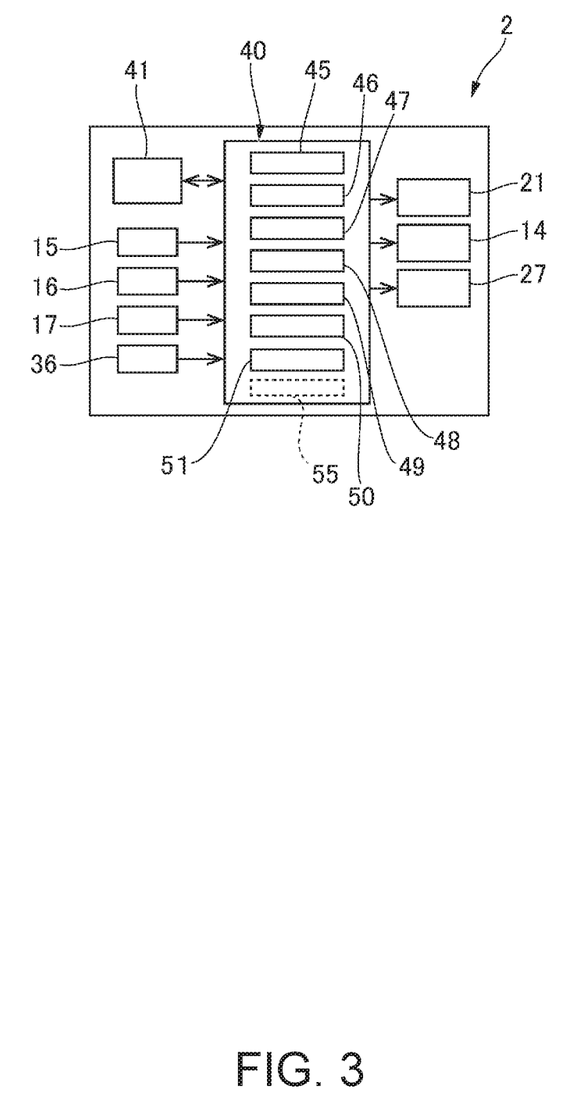
FIG. 3 is a block diagram of the control system of a printer according to a preferred embodiment of the invention.

FIG. 3 is a block diagram illustrating the control system of the printer 2. The control system of the printer 2 is built around a controller 40 having a CPU and a memory storing a firmware. The controller 40 executes the firmware in the memory. The communication unit 41 for communicating with the host device 3 is connected to the controller 40. The error cancellation button 15, power button 16, cutter sensor 36, and a cover detector 17 are also connected to the input side of the controller 40. The printhead 21, LED 14, and conveyance motor 27 are connected to the output side of the controller 40.

The controller 40 includes a printing and cutting controller 45, cutter error detection unit 46 (cutter error detector), error recovery operation controller 47, non-recoverable error detection unit 48 (non-recoverable error detector), operating mode controller 49, command detection unit 51 (command detector), and reporting unit 50 (reporter).

When print data is supplied from the host device 3 through the communication unit 41, the controller 40 drives the conveyance motor 27 to convey the recording paper 6 through the conveyance path 24. The controller 40 also drives the printhead 21 at the same time to print the print data on the recording paper 6 as it passes the printing position A. If a cut command is contained in the print data, the printing and cutting controller 45 drives the cutter motor 34 based on the cut command to move the movable knife 32 between the home position HP and cutting position CP (cutting position B). When the movable knife 32 is moved to the cutting position CP (cutting position B) by driving the cutter motor 34, the printed portion of the recording paper 6 is cut.

If the cutter sensor 36 detects that the moved movable knife 32 did not return to the home position HP, the cutter error detection unit 46 detects a cutter error. More specifically, the cutter error detection unit 46 has a timer, and the printing and cutting controller 45 operates the timer when driving the cutter 22 (cutter motor 34) based on the cut command. If the cutter sensor 36 detects that the movable knife 32 did not return to the home position HP before a specific drive time passes, the cutter error detection unit 46 detects a cutter error. Whether or not the movable knife 32 is at the home position HP is determined based on output from the cutter sensor 36. The specific drive time is time sufficient for the movable knife 32 to go from the home position HP to the cutting position CP and back to the home position HP.

For example, if a foreign object or recording paper 6 is jammed at the cutting position B, interference may result from the movable knife 32 biting into the foreign object or recording paper 6 when it reaches the cutting position CP, and the foreign object or recording paper 6 may interfere with the movable knife 32 returning to the home position HP. The movable knife 32 may be unable to return to the home position HP in such cases. As a result, the cutter error detection unit 46 detects a cutter error.

The error recovery operation controller 47 performs an error recovery operation of driving the moving mechanism 33 to attempt to move the movable knife 32 to the home position HP. The error recovery operation controller 47 executes the error recovery operation when it detects the power button 16 of the printer 2 is on. More specifically, the error recovery operation controller 47 also functions as a power supply detector, treats detecting the printer 2 power turning on as an error cancellation command, and executes the error recovery operation.

The error recovery operation controller 47 also detects an error cancellation command and executes the error recovery operation when it detects that the error cancellation button 15 was operated. The error recovery operation controller 47 also detects an error cancellation command and executes the error recovery operation when the command detection unit 51 detects that an error cancellation command sent from the host device 3 was received by the communication unit 41 by the user operating the input device 9. When the cover detector 17 detects the cover closed, the error recovery operation controller 47 also detects an error cancellation command and executes the error recovery operation. The error recovery operation controller 47 thus detects an error cancellation command and executes the error recovery operation based on detecting the power button 16 turning on, the command detection unit 51 detecting an error cancellation command, or the cover detector 17 detecting the cover closed.

The error recovery operation is described next. First, the error recovery operation controller 47 detects by the cutter sensor 36 whether or not the movable knife 32 is at the home position HP. If the movable knife 32 is not at the home position HP, the error recovery operation controller 47 drives the cutter motor 34 for a specific drive time to move the movable knife 32 to the home position HP. If the cutter sensor 36 detects that the movable knife 32 reached the home position HP during the specific time the cutter motor 34 is driven, the error recovery operation controller 47 stops the cutter motor 34. As a result, the error recovery operation controller 47 can move the movable knife 32 to the home position HP. When the movable knife 32 reaches the home position HP, the error recovery operation controller 47 detects that the cutter error was cleared.

The movable knife 32 may not move to the home position HP even if the error recovery operation is executed when a cutter error is detected, and in this case the cutter error detection unit 46 detects a cutter error. More specifically, the cutter error detection unit 46 operates the timer while the error recovery operation controller 47 drives the cutter 22 (cutter motor 34). If the cutter sensor 36 does not detect that the movable knife 32 returned to the home position HP by the time the specific drive time passes, the cutter error detection unit 46 again detects a cutter error.

If the cutter error detection unit 46 again detects a cutter error even though the error recovery operation was executed, the non-recoverable error detection unit 48 detects a non-recoverable error, that is, being unable to recover from the cutter error. For example, if the error cancellation button 15 is operated and the error recovery operation executed to drive the cutter motor 34 and attempt to move the movable knife 32, but the movable knife 32 does not move and is not detected at the home position HP, the non-recoverable error detection unit 48 detects that a non-recoverable error occurred. When the non-recoverable error detection unit 48 detects a non-recoverable error, the user may have not removed the foreign object at the cutting position B or the jammed recording paper 6, or the foreign object or jammed paper was removed but a problem occurred in the moving mechanism 33 or controller 40 and the movable knife 32 cannot move.

When the non-recoverable error detection unit 48 detects a non-recoverable error, the error recovery operation controller 47 does not execute the error recovery operation even if the command detection unit 51 detected receiving an error recovery command. This prevents executing the error recovery operation needlessly when user operates the input device 9 of the host device 3 and repeatedly sends the error recovery command without having removed the jammed recording paper 6 or foreign object. The user can then know from seeing the non-recoverable error report from the reporting unit 50 that the error cannot be resolved unless the recording paper 6 or other object is removed. The user then operates the power button 16 to turn the power off, opens the cover 4 to access the cutter 22, and removes the jammed recording paper 6 or foreign object. The user then closes the cover 4 and operates the power button 16 to turn the power on. In other words, this operation involves both operating the power button 16 to turn the power off and then on again after removing the obstacle, and opening the cover 4 (Open detection by the cover detector 17) and closing the cover 4 (Closed detection by the cover detector 17 after removing the obstacle). When any or a combination of these actions is detected, it can be determined that the jammed recording paper 6 or foreign object was removed and the printer 2 can recover from the cutter error, and the error cancellation operation controller 47 can interpret this as an error recovery command and execute the error recovery operation.

The operating mode controller 49 changes the operating mode of the printer 2 between a print mode and an off-line mode. The print mode is an operating mode in which the communication unit 41 can send and receive data with the host device 3 and other external devices, and can receive and print print data from the host device 3. The off-line mode is an operating mode in which the communication unit 41 turns off communication with the host device 3 or other external device, and stops receiving data from the host device 3.

The operating mode controller 49 normally sets the operating mode of the printer 2 to the print mode. When a cutter error or non-recoverable error is detected, the operating mode controller 49 changes the operating mode from the print mode to the off-line mode. When the error cancellation operation controller 47 detects that the cutter error or non-recoverable error was resolved, the operating mode controller 49 changes the operating mode of the printer 2 from the off-line mode to the print mode.

When the cutter error detection unit 46 detects a cutter error, the reporting unit 50 reports the cutter error. The cutter error is reported by the reporting unit 50 turning the LED 14 on. When the error cancellation operation controller 47 detects the cutter error was resolved, the reporting unit 50 stops reporting a cutter error, that is, turns the LED 14 off. When the non-recoverable error detection unit 48 detects a non-recoverable error, the reporting unit 50 reports the non-recoverable error. To report a non-recoverable error, the reporting unit 50 causes the LED 14 to blink.

When the communication unit 41 receives a status report command from the host device 3, the reporting unit 50 reports the detected cutter error or non-recoverable error to the host device 3. Note that even when an error causes the operating mode of the printer 2 to go to the off-line mode in which communication is disabled, the communication unit 41 can continue to receive real-time commands. A status report command is an example of a real-time command. The controller 40 monitors data received by the communication unit 41 from the host device 3. If the received data contains a status report command, which is a real-time command, the controller 40 receives the status report command, and interprets and executes the real-time command (status report command) with priority over the operating mode of the printer 2 and other control operations of the printer 2. The controller 40 therefore receives status report commands from the host device 3 even if the printer 2 is in the off-line mode, and reports cutter errors or non-recoverable errors through the communication unit 41 to the host device 3.

Error Recovery Operation

Figure 4:
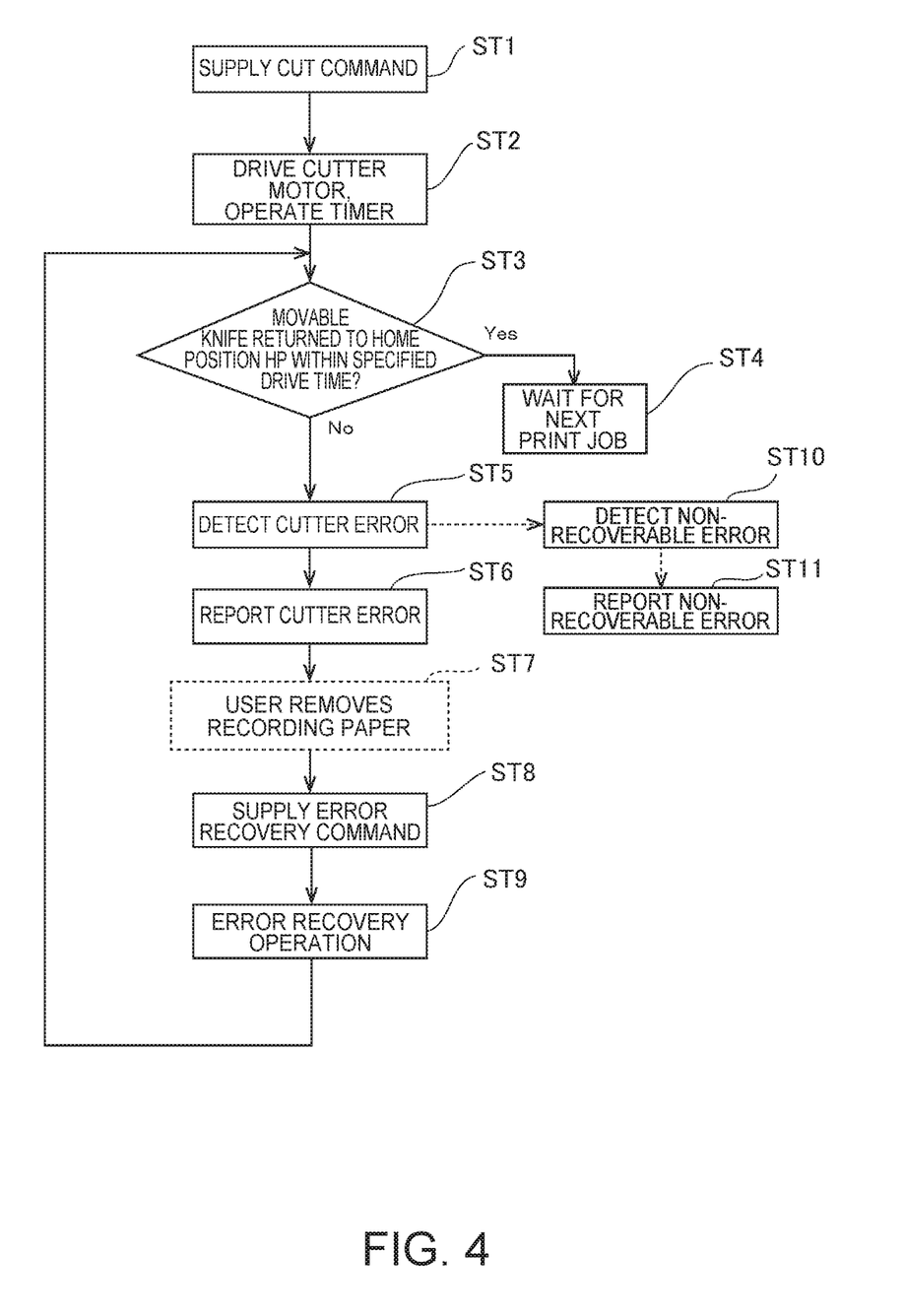
FIG. 4 is a flow chart of the process reporting cutter errors and non-recoverable errors according to an embodiment of the invention.

FIG. 4 describes the cutter error and non-recoverable error reporting operation of the printer 2.

When the printer 2 receives print data including a cut command (step ST1), the printing and cutting controller 45 drives the conveyance motor 27 and printhead 21 to print the print data on the recording paper 6. The printing and cutting controller 45 then drives the cutter 22 based on the cut command to cut the recording paper 6. When the printing and cutting controller 45 operates the cutter 22, the cutter error detection unit 46 operates the timer and monitors if the movable knife 32 returns to the home position HP within the specified drive time (step ST2, step ST3).

If the movable knife 32 returned to the home position HP within the specified drive time (step ST3: Yes), a cutter error is not detected because cutting ended normally. The printer 2 therefore waits to receive the next print data (step ST4).

However, if recording paper 6 is jammed at the cutting position B and interference of the recording paper 6 with the movable knife 32 prevents the movable knife 32 from moving, the movable knife 32 will not return to the home position HP within the specified drive time (step ST3: No). The cutter error detection unit 46 therefore detects a cutter error. When a cutter error is detected, the reporting unit 50 turns the LED 14 on to report the cutter error. The operating mode controller 49 also sets the operating mode to the off-line mode (step ST5, step ST6). If the operating mode of the printer 2 is set to the off-line mode but a status report command (real-time command) is sent from the host device 3 to the printer 2 and received by the communication unit 41, the controller 40 reports the cutter error through the communication unit 41 to the host device 3.

When a cutter error is reported by the reporting unit 50 or by the host device 3 receiving the cutter error and displaying a message on the display 8, the user knows from the cutter error report to remove the jammed recording paper 6 (step ST7). Once the jammed recording paper 6 is removed, the user operates the error cancellation button 15 to send an error recovery command to the controller 40. Alternatively, the user operates the input device 9 of the host device 3 to send an error recovery command to the printer 2, which the communication unit 41 then receives (step ST8). As a result, the error cancellation operation controller 47 executes the error recovery operation to move the movable knife 32 to the home position HP (step ST9). Note that once the recording paper 6 is removed, the user may alternatively operate the power button 16 to turn the printer 2 power on again. The error cancellation operation controller 47 also executes the error recovery operation in this case to move the movable knife 32 to the home position HP.

When the cutter 22 is driven in the error recovery operation, the cutter error detection unit 46 operates the timer and monitors if the movable knife 32 returns to the home position HP within the specified drive time (step ST3). If the movable knife 32 moves the home position HP within the specified drive time (step ST3: Yes), the error cancellation operation controller 47 detects that the cutter error was resolved. When the cutter error is resolved, the operating mode controller 49 returns the operating mode of the printer 2 to the print mode. The printer 2 then waits to receive the next print data (step ST4).

However, if in the error recovery operation the movable knife 32 does not move to the home position HP within the specified drive time (step ST3: No), the cutter error detection unit 46 again detects a cutter error (step ST4). If a cutter error is detected again even though the error recovery operation was executed, the non-recoverable error detection unit 48 detects a non-recoverable error. More specifically, if the error recovery operation is executed but the movable knife 32 does not move to the home position HP within the specified drive time for some reason, the cutter error detection unit 46 detects a non-recoverable error (step ST10).

For example, if the movable knife 32 does not move to the home position HP even though the user removed the recording paper 6, for example, a problem may have occurred in the moving mechanism of the cutter 22 or the controller 40. In this event, moving the movable knife 32 to the home position HP is difficult. The non-recoverable error detection unit 48 therefore detects a non-recoverable error.

When a non-recoverable error is detected, the reporting unit 50 causes the LED 14 to blink to report the non-recoverable error (step ST11). When a non-recoverable error is detected, the operating mode of the printer 2 remains in the off-line mode. The communication unit 41 receives status report commands (real-time commands) sent from the host device 3 to the printer 2 even in the off-line mode, and the controller 40 sends a non-recoverable error report to the host device 3.

If a cutter error is detected again even though the error recovery operation was executed for a cutter error, this embodiment of the invention reports or sends a non-recoverable error instead of a cutter error. Because the user can therefore know that a non-recoverable error occurred, repeating the error recovery operation can be suppressed.

When a status report command (real-time command) is sent from the host device 3 to the printer 2 in this example, the status report command (real-time command) is received even if the operating mode of the printer 2 is set to the off-line mode, and a cutter error or non-recoverable error is sent to the host device 3. The host device 3 can therefore know the errors that occurred on the printer 2.

Other Embodiments

The printer may also have a counter that counts the error recovery operation count (how many times the error recovery operation executes) and a storage unit (storage) that stores the count when a cutter error is again detected even though the error recovery operation was executed. When such a counter and storage unit are provided, the reporting unit 50 can be configured to report a non-recoverable error when the error recovery operation count reaches a specific predetermined value. This specific value may be two or three times, for example. This configuration allows the user to try the error recovery operation a specific number of times, but prevents the error recovery operation from executing more than the specific number of times. Note that the storage unit preferably stores the cumulative error recovery operation count in nonvolatile memory, and the cumulative error recovery operation count is cleared to zero when the error cancellation operation controller 47 detects the cutter error was cleared.

The printer may also have a cutter knife evaluation unit 55 (see FIG. 3) that determines if the movable knife 32 is at the home position HP when a non-recoverable error is detected. If the cutter knife evaluation unit 55 determines the movable knife 32 is at the home position HP, the operating mode controller 49 changes the operating mode of the printer 2 from the off-line mode to the print mode. Print data including cut commands can be received from the host device 3. The printing and cutting controller 45 can also print the received print data while ignoring and not executing the received cut command. In other words, after printing on the paper roll 5 based on the print data, the printing and cutting controller 45 can ignore the cut command contained in the print data and not cut the recording paper 6 with the cutter 22.

Thus comprised, print data can be printed even when a non-recoverable error was detected. When a non-recoverable error is detected, a problem may have occurred in the moving mechanism of the cutter 22 or the controller 40, and the cutter 22 may be unable to operate. However, if the movable knife 32 is at the home position HP, the movable knife 32 will not interfere with the recording paper 6, and the recording paper 6 can be conveyed through the conveyance path 24. The printhead 21 can therefore be driven to print on the recording paper 6 conveyed past the printing position A. The user can therefore continue the printing process uninterrupted even if a non-recoverable error is detected.

The function blocks described above with reference to the figures can be embodied as desired by the cooperation of hardware and software, and do not suggest a specific hardware configuration.

The function blocks shown in the accompanying function block diagrams illustrate the functional configurations of the devices, but the specific embodiments thereof are not so limited. More specifically, there is no requirement for hardware embodiments of the function blocks shown in the figures, and a configuration in which the functions of plural functional parts are rendered by a single processor executing one or more programs is obviously conceivable. Some functions embodied by software in the foregoing embodiment may also alternatively be embodied by hardware, and some functions embodied by hardware in the foregoing embodiment may also alternatively be embodied by software.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method of a printer capable of communicating with an external device, configured to have a controller, a cutter configured to move a cutter knife and cut recording paper between a home position and a cutting position, using the controller, comprising:
   reporting a cutter error when the moved cutter knife does not return to the home position;
   executing an error recovery operation to attempt to move the cutter knife to the home position based on an error recovery command corresponding to the cutter error; and
   detecting a non-recoverable error, if the cutter error is detected again even though the error recovery operation was executed, and reporting the non-recoverable error.

2. The control method of a printer described in claim 1, the error recovery command being based on detecting a power turning on, an error recovery command from the external device, or a cover closing.

3. The control method of a printer described in claim 2, further comprising: not executing the error recovery operation when a non-recoverable error occurs even if the error recovery command is detected.

4. The control method of a printer described in claim 1, further comprising: counting how many times the error recovery operation was performed if the cutter error is again detected after the error recovery operation is executed; and reporting the non-recoverable error if this error recovery operation count reaches a previously set number.

5. The control method of a printer described in claim 1, further comprising: if the cutter error or non-recoverable error is detected, changing the operating mode from a print mode in which data can be received from the external device and printed to an off-line mode in which receiving data from the external device stops; and while in the off-line mode, continuing to receive a real-time command from the external device, and based on the real-time command, reporting the cutter error or non-recoverable error to the external device.

6. The control method of a printer described in claim 1, further comprising: determining if the cutter knife is at the home position if print data containing a cut command is received from the external device after the non-recoverable error is detected; and if the cutter knife is determined to be at the home position, printing the print data on the recording paper, ignoring the cut command, and not executing the cutting operation with the cutter knife.

7. A printer comprising:
   a memory configured to store a firmware;
   a controller configured to execute the firmware in the memory;
   a processor configured to communicate with an external device;
   a cutter knife;
   a moving mechanism configured to move the cutter knife between a home position and a cutting position to cut recording paper; wherein
   the processor also is configured to detect the cutter knife moved by the moving mechanism not returning to the home position as a cutter error;
   the controller is configured to execute an error recovery operation of operating the moving mechanism and attempting to move the cutter knife to the home position based on an error recovery command responding to the cutter error;
   the processor also is configured to detect again detecting the cutter error even though the error recovery operation executed as a non-recoverable error; and
   the processor also is configured to report the cutter error when the cutter error occurs, and report the non-recoverable error when the non-recoverable error occurs.

8. The printer described in claim 7, further comprising: at least one of a power detector, a command detector, and a cover detector; and the controller handling as the error recovery command detection of at least one of the power detector detecting the power turned on, the command detector detecting the error recovery command from the external device, and the cover detector detecting a cover closed, and executing the error recovery operation.

9. The printer described in claim 8, wherein: when the non-recoverable error detector detects the non-recoverable error, the controller does not execute the error recovery operation even if the command detector detects at least the error recovery command.

10. The printer described in claim 7, further comprising: a storage, the storage storing an error recovery operation count indicating how many times the error recovery operation was executed when the cutter error is detected again after the error recovery operation is executed; and the reporter reporting the non-recoverable error when the error recovery operation count of the storage reaches a previously set specific count.

11. The printer described in claim 7, wherein: the controller changes from a print mode in which data can be received from the external device and printed to an off-line mode in which receiving data from the external device by the communicator stops if the cutter error or non-recoverable error is detected; and while in the off-line mode, continues receiving a real-time command from the external device by the communicator, and based on the real-time command, reports the cutter error or non-recoverable error to the external device.

12. The printer described in claim 7, wherein: the controller determines if the cutter knife is at the home position when the communicator receives print data containing a cut command after the non-recoverable error detector detects the non-recoverable error, and if the cutter knife is at the home position, prints the print data to the recording paper, ignores the cut command, and does not execute the cutting operation.

* * * * *